Aug. 17, 1965    M. M. AYDELOTT    3,201,150
JOINT SEAL FOR CONCRETE-LINED PIPE
Filed Nov. 9, 1959
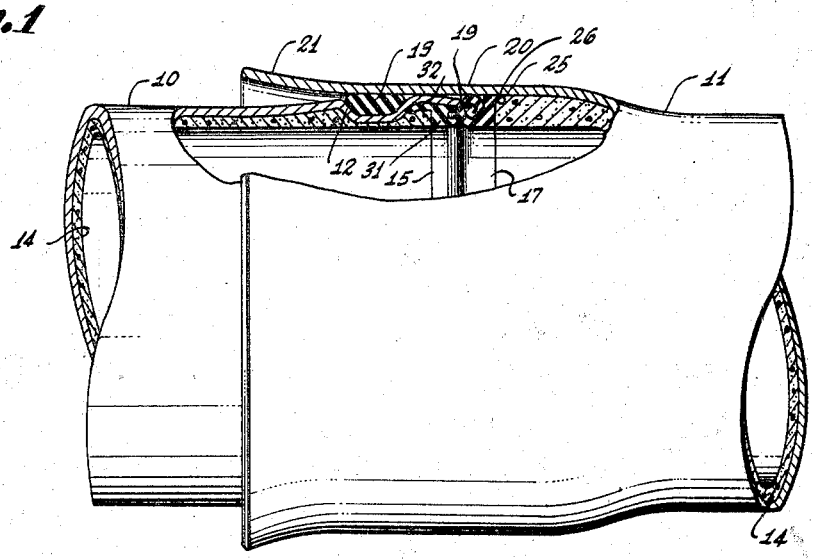
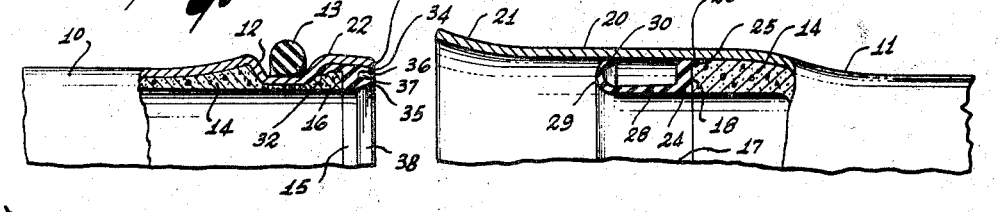
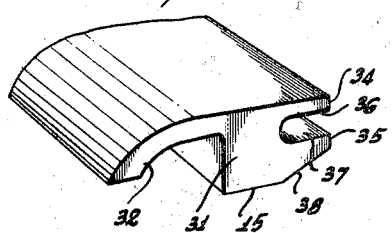
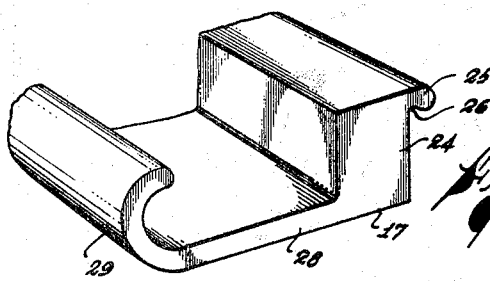
INVENTOR.
MAX M. AYDELOTT
BY Fulwider Mattingly & Huntley
Attorneys

United States Patent Office 3,201,150
Patented Aug. 17, 1965

3,201,150
JOINT SEAL FOR CONCRETE-LINED PIPE
Max M. Aydelott, Azusa, Calif., assignor, by mesne assignments, to American Pipe and Construction Co., Monterey Park, Calif., a corporation of California
Filed Nov. 9, 1959, Ser. No. 851,869
7 Claims. (Cl. 285—55)

The present invention relates generally to pipe joints and particularly to self-sealing joints for cement lined pipes.

It is customary in laying cement lined metal pipes to seal the joint by applying a cement grout. Usually this is accomplishd by generously "buttering" with grout the two pipe ends to be joined and then moving the ends together to final positions. Excessive grout is extruded out of the joint upon joining movement of the pipes and in smaller diameter pipes is removed by a "wiping" process in which a ball of appropriate size is pulled through the pipe.

In cement lined pipes of sufficiently large size to permit entry of a worker, sealing the joints with cement grout is satisfactory since visual inspection of the integrity of the grout seal can be made. Therefore, final reliance need not be placed on an assumed effectiveness of the buttering, extruding and wiping steps, if that process has been used in the large pipes. But in pipes too small to permit visual inspection, it has been determined that this grouting process has not always been effective. When two pipe ends are joined the machinery or equipment used for the purpose is sometimes manipulated in a way to impact the pipes so that the grout, which is still soft, is jarred out of the joint, particularly if the grout has not been mixed to proper slump specifications. If the integrity of the grout seal has been thus destroyed, the fluid carried by the pipe penetrates the cement lining at the joint and causes deterioration of the metal pipe surrounding the lining.

It is therefore a major object of the invention to provide an improved sealing means for the joints of cement lined metal pipes which overcomes the above-mentioned disadvantages.

Another object of the invention is to provide a self-sealing joint for cement lined pipe that closes automatically in response to the act of joining two pipe ends.

A further object of the invention is to provide an improved sealing means for telescopically joined, cement lined metal pipes that creates what may be termed a "dead space," or a "dead" annular volume of fluid whose oxygen has been spent whereby corrosion of the metal pipe within the joint is prevented.

It is also an object of the invention to provide a dead space seal arrangement comprising a self-sealing means intermediate the confronting ends of the cement linings of a telescopically joined pair of metal pipes and a self-sealing means intermediate the outer surface of the male pipe end and inner surface of the female pipe end, the dead space being defined between the two sealing means.

Yet another object of the invention is to provide a joint seal of the self-sealing type to eliminate the grouting process whereby sealed joints of uniformly high quality can be achieved consistently to eliminate the possibility of subjecting the metal pipes to the deteriorating action of the fluid conducted through the pipes.

Another object of the invention is to provide a pair of elastomeric rings, for sealing the joints of cement lined pipes, that are cooperatively configured to effect a fluid-tight seal therebetween by being moved together.

Yet another object of the invention is to provide a self-sealing pair of rings for pipe joints that do not cause any diminution in the internal diameter of the pipe.

A still further object of the invention is to provide a self-sealing pair of rings for cement lined pipes that will effect a seal of the joint even though the pipes are not perfectly aligned.

These and other objects and advantages of the invention will be apparent from a consideration of the following specification, taken in conjunction with the annexed drawings wherein:

FIGURE 1 is a fragmentary view of the mated ends of two sections of pipe, portions thereof being broken away to expose a longitudinal section of the pipe joint;

FIGURE 2 is a fragmentary view of the longitudinally sectioned portions of the pipe shown in FIGURE 1, before the pipes have been moved together and particularly illustrating the normal configuration of the sealing members;

FIGURE 3 is a perspective view of a piece of one of the pair of sealing members; and FIGURE 4 is a perspective view of a piece of the other sealing member.

In accordance with the invention sections of metal pipe are formed with mating male and female ends and are interiorly lined with cement. A pair of elastomeric seal rings are provided, one of which is embedded in the end face of the concrete lining at the female end and the other of which is embedded in the end face of the concrete lining of the male end. These seal rings are preferably extruded and have distinctively different cross-sectional configurations. While one of these rings is embedded in the concrete lining so as to be held flush with the end of the male member, the other seal ring is embedded in the end of the concrete lining well within the female member. One of these seal rings has a relatively thin wall of appreciable axial length extending towards the other seal ring and the confronting portions of the pair of seal rings are adapted to effect a rolling upon itself of this relatively thin wall when the two seal rings are brought together in response to mating engagement of the pair of pipe sections. A fluid seal is thereby effected between the abutting parts of the pair of seal rings. Another fluid seal is effected between confronting surfaces of the coupled metal members by a gasket ring whereby an annular dead space is defined at one end by the gasket and at the other end by the pair of seal rings.

The drawing illustrates a presently preferred embodiment of the invention. In this embodiment the mating ends of the pipe sections comprise a male end or spigot or spigot end 10 and a female end or bell or bell end 11, it being understood that each pipe section is characterized by having a bell at one end and a spigot at the other end. This spigot end 10 is formed with a groove 12 receiving an elastomeric annular gasket 13 which is normally of circular cross-section and composed of rubber-like material that is resilient and compressible. The gasket 13 is deformable into the groove 12 by bringing the spigot end 10 and the bell end 11 of two adjacent lengths of pipe together to the position illustrated in FIGURE 1. The gasket 13 is thus self-sealing between the inner face of the bell 11 and outer face of the spigot 10. This construction of the spigot 10, bell 11, groove 12 and gasket 13 is disclosed in the co-pending patent application of Douglas A. Stromsoe and myself, Serial No. 717,094, filed February 24, 1958, and now abandoned, but it will be understood that other configurations are suitable.

The sections of pipe have an interior lining 14 of cement which extends for almost the entire length of the pipe. At the spigot 10 an elastomeric seal ring 15 is embedded in one end face 16 of the lining 14. In the bell end 11 an elastomeric seal ring 17 is embedded in the other end face 18 of the lining 14. It will be understood that the lining 14 is of a uniform internal diameter throughout its length and it will be noted that the rings 15 and 17 are of the same internal diameter as the lining. The ring 15 is positioned in the spigot 10 between the groove 12 and extreme end 19 of the spigot so as to be substantially flush with the end 19. The bell 11 includes a substantially cylindrical portion 20 and develops at its extreme end into an outwardly flared portion 21. The seal ring 17 is positioned within the cylindrical portion 20, which in turn is of an internal diameter adapted to slidably receive an enlarged diameter portion 22 of the spigot 10 just behind the extreme end 19.

In order to secure the seal member 17 in place, it is formed with a relatively thick base portion 24 that along its radially outermost side has an integrally formed and rearwardly extending bead 25. This bead is substantially cylindrical in cross-sectional configuration and is joined to the base portion 24 through a thinner portion 26. A suitable length of the extruded material (FIGURE 4) from which the seal 17 is formed is cut and the ends brought together to define the seal ring 17, the ends then being vulcanized or otherwise secured together. The seal ring 17 is then pressed into place while the cement of the lining 14 is still soft and the cement penetrates into the space or valley between the body portion 24 and bead 25 against the thinner portion 26 of the seal ring whereby the seal ring is effectively keyed to the cement lining 14 when the lining dries.

The seal ring 17 has a relatively thin annular wall 28 that extends axially forwardly from the base portion 24, i.e., oppositely from the direction of the bead 25. The wall 28 is formed integrally with the radially innermost side of the base portion 24 and its extremity develops into an outwardly rolled lip 29. Referring to FIGURE 2, it will be observed that the lip 29 has a radius adapted to bring its edge into contact with the inner surface of the cylindrical portion 20 of the bell 11. This radius is such that the lip 29 has a light sealing engagement 30 with the bell whereby to prevent entry of foreign matter into the space behind the lip 29, prior to installation of the pipe.

The seal ring 15 is similarly made from a suitable length of extruded material of the cross-sectional configuration shown in FIGURE 3. This seal ring has a relatively thick base portion 31 and on its radially outermost surface has a configuration complementary to the configuration of that portion of the spigot 10 between the groove 12 and the extreme end 19. This complementary configuration includes a rearwardly extending curved flange 32, integral with the radially outermost portion of the seal ring 15, within which the cement of the lining 14 at the spigot end of the pipe section is keyed. The seal ring 15 is thus held in place by a sufficiently strong section of cement overlying the flange 32 even though the radial thickness of lining 14 within the spigot 10 is substantially less than the lining thickness in the bell 11.

Two stubby annular lips 34 and 35 are also formed integrally with the base portion 31 and extend axially forwardly to terminate in substantially a common plane with the extreme end 19 of the spigot 10. The lip 34 comprises a continuation of the radially outermost surface of the seal ring 15 and the lip 35 is spaced radially inward from the lip 34. The lip 34 is of substantially uniform width from its extremity to the base portion 31 and its radially innermost face 36 is substantially parallel to the radially outermost face 37 of the inner lip 35. The lip 35 has a radially innermost face 38 that tapers conically from the extremity of the lip to the radially innermost surface of the seal ring 15.

In order to make up a fluid-tight joint, the bell and spigot ends of the pair of pipe sections are merely coaxially pushed together. As the spigot 10 and bell 11 are pushed together, the extreme end 19 of the spigot and the lips 34 and 35 of the seal ring 15 come into contact with the curled lip 29 of the seal ring 17. The extreme pipe end 19 engages the reversely turned extremity of the curved lip 29, and accordingly, tends to push the lip 29 radially inwardly as well as axially rearwardly towards the base portion 24 of the seal ring 17. However, the tendency of the extreme pipe end 19 to deflect the curled lip 29 radially inwardly is prevented by the configuration of the lip 35 on the seal ring 15. The extremity of the lip 35 is spaced just radially outwardly from the wall 28 of the seal ring 17. The lip 35 engages the curled lip 29 substantially concurrently with contact between the spigot end 19 and the extremity of the curled lip. Due to the frusto-conical configuration of the radially inner side or face 38 of the lip 35, the lip 35 tends to roll the curled lip 29 radially outwardly against the cylindrical portion 20, thence backwards upon itself and onto the thin wall 28 of the seal ring 17. At the same time this configuration of the radially inner face 38 resists the previously mentioned tendency of the spigot end 19 to deflect the extremity of the curled lip 29 radially inwardly as the curled lip is being rolled backwards. The spigot 10 and bell 11 are pushed together until the curled lip 29 has been substantially completely rolled back upon the wall 28 as illustrated in FIGURE 1. Due to the resilient nature of the material of the seal, it tends to unroll whereby portions of the curled lip 29 and wall 28 are biased into sealing contact with the extreme end 19 of the spigot, and the lips 34 and 35 of the seal ring 15.

The two sections of pipe thus joined will have a sealed joint even if the two pipe sections are not perfectly aligned. The sealing of misaligned pipes will occur due to the appreciable axial length of the wall 28 of the seal ring 17. Since the resilient material of the seal ring 17 continually biases the lip 29 (after it has been rolled up to the position of FIGURE 1) against the spigot end 19 and the extremities of the lips 34 and 35 of the seal ring 15, the traces of sealing contact between the lip 29 and the end 19 and lips 34 and 35 can be within a miter plane, i.e., a plane which is not normal to the axis of the bell 11. The bell and spigot pipe end configuration is also important in this respect, as is pointed out in the aforementioned co-pending patent application. Concurrently with making up the joint seal in the manner just described, the gasket 13 is deformed into the groove 12 into the configuration shown in FIGURE 1, this also being accomplished in accordance with the construction disclosed in the aforementioned co-pending patent application.

As is apparent, the gasket 13, being greatly compressed, gives a tighter fluid seal than the contact of the seal rings 15 and 17, and sufficiently tight to withstand the greatest fluid pressures anticipated. In low pressure lines, the rings 15 and 17 will prevent the fluid in the pipes gaining access to the annular space between the gasket 13 and the pair of seal rings. In high pressure lines (e.g. 500 p.s.i.) the fluid penetrates between the seals 15 and 17, enters this annular space, and flushes out the air trapped in the space, this air being carried away with the fluid in the pipes. When the fluid trapped in this space has a pressure approaching the internal line pressure, the seals 15 and 17 again become effective. For example, in certain tests of water pipe when the water pressure on the inside face 38 of the lip 35 is greater, by about 80 pounds, than the dead space water pressure, as reflected on the outer face 37 of the lip 35, this lip sealingly re-engages the seal 17. Thereafter, the oxygen of the water trapped in the annular space is quickly spent and no corrosion of the portions of the metal pipes in the dead space can ensue. Surges of fluid in the pipes will not cause interchange of fluid in the dead space since the lip 35 is adapted to withstand a desired pressure differential without being removed from sealing contact with the seal 17 (e.g., 80 pounds differential pressure in the above example).

From the foregoing it will be apparent that this invention provides an improved self-sealing joint which overcomes the disadvantages inherent in the grout type of seal. It will be noted that the sealing elements are closed automatically merely in response to joining of a pair of pipe sections. Thereafter the liquids carried within the joined pipes are prevented from penetrating to the metal portions of low pressure conduits, and prevented from circulating through the dead space in high pressure conduits. The sealing efficiency of the sealing rings 15 and 17 is not affected by impacts which may be imparted to the pipes being joined during the process of joining them. Both seal rings are effectively anchored within the pipe ends in a manner to obviate any displacement due to rough handling of the pipe sections. The curling feature of the lip 29 provides a biasing action which will insure a long service life for the seal rings and the sealing action will occur even though a pair of joined pipes are not in perfect alignment.

While a preferred embodiment of the invention has been illustrated and described herein, the invention is not to be limited to the details of construction described and shown except as defined in the appended claims.

I claim:

1. In a pipe joint, the combination of:
   (a) a bell provided therein with a bell lining having an end face spaced axially inwardly from the outer end of said bell;
   (b) a spigot axially insertable into said bell and provided therein with a spigot lining having an end face adapted to confront said end face of said bell lining;
   (c) an elastomeric, annular bell seal within said bell and engaging said bell and said end face of said bell lining;
   (d) said bell seal including an annular wall spaced radially inwardly from said bell and extending axially toward said outer end of said bell and terminating at its outer end in a radially-outwardly-extending, radially-outwardly-rolled, annular lip engaging said bell;
   (e) means on said spigot and engageable with said annular lip upon insertion of said spigot into said bell for rolling said annular wall back upon itself and axially toward said end face of said bell lining; and
   (f) an elastomeric, annular, outer sealing means engageable with said bell and said spigot between said outer end of said bell and said bell seal.

2. In a pipe joint, the combination of:
   (a) a bell provided therein with a bell lining having an end face spaced axially inwardly from the outer end of said bell;
   (b) a spigot axially insertable into said bell and provided therein with a spigot lining having an end face adapted to confront said end face of said bell lining;
   (c) an elastomeric, annular bell seal within said bell and engaging said bell and said end face of said bell lining;
   (d) said bell seal including an annular wall spaced radially inwardly from said bell and extending axially toward said outer end of said bell and terminating at its outer end in a radially-outwardly-extending, radially-outwardly-rolled, annular lip engaging said bell;
   (e) means on said spigot and engageable with said annular lip upon insertion of said spigot into said bell for rolling said annular wall back upon itself and axially toward said end face of said bell lining;
   (f) said means of subparagraph (e) hereof comprising an elastomeric, annular spigot seal within said spigot and engaging said spigot and said end face of said spigot lining;
   (g) said spigot seal having an outer end substantially flush with the outer end of said spigot; and
   (h) an elastomeric, annular, outer sealing means engageable with said bell and said spigot between said outer end of said bell and said bell and spigot seals.

3. In a pipe joint, the combination of:
   (a) a bell provided therein with a bell lining having an end face spaced axially inwardly from the outer end of said bell;
   (b) a spigot axially insertable into said bell and provided therein with a spigot lining having an end face adapted to confront said end face of said bell lining;
   (c) an elastomeric, annular bell seal within said bell and engaging said bell and said end face of said bell lining;
   (d) said bell seal including an annular wall spaced radially inwardly from said bell and extending axially toward said outer end of said bell and terminating at its outer end in a radially-outwardly-extending, radially-outwardly-rolled, annular lip engaging said bell;
   (e) means on said spigot and engageable with said annular lip of said bell seal upon insertion of said spigot into said bell for rolling said annular wall of said bell seal back upon itself and axially toward said end face of said bell lining;
   (f) said means of subparagraph (e) hereof comprising an elastomeric, annular spigot seal within said spigot and engaging said spigot and said end face of said spigot lining;
   (g) said spigot seal having an outer end substantially flush with the outer end of said spigot and comprising radially spaced, annular, axially extending, inner and outer lips engageable with said annular lip of said bell seal; and
   (h) an elastomeric, annular, outer sealing means engageable with said bell and said spigot between said outer end of said bell and said bell and spigot seals.

4. In a pipe joint, the combination of:
   (a) a bell provided therein with a bell lining having an end face spaced axially inwardly from the outer end of said bell;
   (b) a spigot axially insertable into said bell and provided therein with a spigot lining having an end face adapted to confront said end face of said bell lining;
   (c) an elastomeric, annular bell seal within said bell and engaging said bell and said end face of said bell lining;
   (d) said bell seal including an annular wall spaced radially inwardly from said bell and extending axially toward said outer end of said bell and terminating at its outer end in a radially-outwardly-extending, radially-outwardly-rolled, annular lip engaging said bell;
   (e) means on said spigot and engageable with said annular lip of said bell seal upon insertion of said spigot into said bell for rolling said annular wall of said bell seal back upon itself and axially toward said end face of said bell lining;
   (f) said means of subparagraph (e) hereof comprising an elastomeric, annular spigot seal within said spigot and engaging said spigot and said end face of said spigot lining;
   (g) said spigot seal having an outer end substantially flush with the outer end of said spigot and comprising radially spaced, annular, axially extending, inner and outer lips engageable with said annular lip of said bell seal;
   (h) the radially inner surface of said inner lip of said spigot seal diverging toward said outer end of said spigot seal; and
   (i) an elastomeric, annular, outer sealing means engageable with said bell and said spigot between said outer end of said bell and said bell and spigot seals.

5. In a pipe joint, the combination of:
   (a) a bell provided therein with a bell lining having an end face spaced axially inwardly from the outer end of said bell;
(b) a spigot axially insertable into said bell and provided therein with a spigot lining having an end face adapted to confront said end face of said bell lining;
(c) an elastomeric, annular bell seal within said bell and engaging said bell and said end face of said bell lining;
(d) said bell seal including an annular wall spaced radially inwardly from said bell and extending axially toward said outer end of said bell and terminating at its outer end in a radially-outwardly-extending, radially-outwardly-rolled, annular lip engaging said bell;
(e) means on said spigot and engageable with annular lip of said bell seal upon insertion of said spigot into said bell for rolling said annular wall of said bell seal back upon itself and axially toward said end face of said bell lining;
(f) said means of subparagraph (e) hereof comprising an elastomeric, annular spigot seal within said spigot and engaging said spigot and said end face of said spigot lining;
(g) said spigot seal having an outer end substantially flush with the outer end of said spigot and comprising radially spaced, annular, axially extending, inner and outer lips engageable with said annular lip of said bell seal;
(h) the radially inner surface of said inner lip of said spigot seal diverging toward said outer end of said spigot seal;
(i) an elastomeric, annular, outer sealing means engageable with said bell and said spigot between said outer end of said bell and said bell and spigot seals; and
(j) said bell and spigot seals providing a less fluid tight seal than said outer sealing means.

6. The pipe joint of claim 5 wherein said bell flares toward its said outer end and is integral with a pipe.

7. In a pipe joint, the combination of:
(a) a bell provided therein with a bell lining having an end face spaced axially inwardly from the outer end of said bell;
(b) a spigot axially insertable into said bell and provided therein with a spigot lining having an end face adapted to confront said end face of said bell lining;
(c) an elastomeric, annular bell seal within said bell and engaging said bell and said end face of said bell lining;
(d) said bell seal including an annular wall spaced radially inwardly from said bell and extending axially toward said outer end of said bell and terminating at its outer end in a radially-outwardly-extending, radially-outwardly-rolled, annular lip;
(e) means on said spigot and engageable with said annular lip upon insertion of said spigot into said bell for rolling said annular wall back upon itself and axially toward said end face of said bell lining; and
(f) an elastomeric, annular, outer sealing means engageable with said bell and said spigot between said outer end of said bell and said bell seal.

References Cited by the Examiner

UNITED STATES PATENTS

| | | | |
|---|---|---|---|
| 489,107 | 1/93 | Storz | 285—352 |
| 653,143 | 7/00 | Martin | 285—67 |
| 1,538,007 | 5/25 | Schellin | 277—58 |
| 2,233,734 | 3/41 | Ely | 285—55 |
| 2,272,115 | 2/42 | Halkyard | 285—347 |
| 2,340,537 | 2/44 | Keener | 285—288 |
| 2,438,312 | 3/48 | Bunn | 285—54 |
| 2,518,829 | 8/50 | Smith | 285—284 |
| 2,561,884 | 7/51 | Perrow | 285—110 |
| 2,662,555 | 12/53 | Hirsh | 285—347 |
| 2,712,456 | 7/55 | McCreery | 285—226 |
| 2,770,476 | 11/56 | Cleverly | 285—423 |
| 2,805,683 | 9/57 | Kennison | 285—288 |
| 2,805,872 | 9/57 | Routh | 285—55 |
| 2,912,262 | 11/59 | Franck | 285—351 |

FOREIGN PATENTS

| | | |
|---|---|---|
| 564,484 | 2/58 | Belgium. |
| 491,158 | 2/30 | Germany. |
| 643,721 | 4/37 | Germany. |
| 806,818 | 6/51 | Germany. |

CARL W. TOMLIN, *Primary Examiner.*

ARTHUR B. MILLER, EDWARD C. ALLEN,
*Examiners.*